US008949196B2

(12) United States Patent
Duleba

(10) Patent No.: US 8,949,196 B2
(45) Date of Patent: Feb. 3, 2015

(54) SYSTEMS AND METHODS FOR MATCHING SIMILAR GEOGRAPHIC OBJECTS

(71) Applicant: Google Inc., Mountain View, CA (US)

(72) Inventor: Krzysztof Duleba, Pfaffikon (CH)

(73) Assignee: Google Inc., Mountain View, CA (US)

( * ) Notice: Subject to any disclaimer, the term of this patent is extended or adjusted under 35 U.S.C. 154(b) by 75 days.

(21) Appl. No.: 13/708,483

(22) Filed: Dec. 7, 2012

(65) Prior Publication Data

US 2014/0164415 A1 Jun. 12, 2014

(51) Int. Cl.
*G06F 17/30* (2006.01)

(52) U.S. Cl.
CPC ............................. *G06F 17/30241* (2013.01)
USPC ........................................................ 707/673

(58) Field of Classification Search
USPC .................................................. 707/722, 726
See application file for complete search history.

(56) References Cited

U.S. PATENT DOCUMENTS

| 6,636,804 | B1 | 10/2003 | Joshi |
| 7,562,289 | B2 | 7/2009 | Bufkin et al. |
| 7,660,441 | B2 | 2/2010 | Chen et al. |
| 7,792,883 | B2 | 9/2010 | Buron et al. |
| 7,801,904 | B2 | 9/2010 | Natesan et al. |
| 7,805,442 | B1 | 9/2010 | Joshi et al. |
| 7,912,837 | B2 | 3/2011 | Buron et al. |
| 7,925,677 | B2 | 4/2011 | Sheridan |
| 2004/0068724 | A1 | 4/2004 | Gardner, III et al. |
| 2007/0168370 | A1 | 7/2007 | Hardy |
| 2007/0198586 | A1 | 8/2007 | Hardy et al. |
| 2007/0276845 | A1 | 11/2007 | Geilich |
| 2008/0319990 | A1 | 12/2008 | Taranenko et al. |
| 2010/0119121 | A1* | 5/2010 | Lim ............................... 382/113 |
| 2010/0306287 | A1 | 12/2010 | Raphaeil |
| 2010/0329504 | A1 | 12/2010 | Chen |
| 2011/0055224 | A1 | 3/2011 | Rossio et al. |
| 2012/0271883 | A1 | 10/2012 | Montoya et al. |
| 2013/0181197 | A1* | 7/2013 | Lee et al. ........................ 257/40 |

OTHER PUBLICATIONS

International Search Report & Written Opinion for PCT App. No. PCT/US2013/069625, mailed Feb. 26, 2014. (pp. 1-12).

* cited by examiner

*Primary Examiner* — Baoquoc N To
(74) *Attorney, Agent, or Firm* — Bracewell & Giuliani LLP

(57) ABSTRACT

A computer-implemented method including obtaining a subject dataset including two or more features associated with a subject geographic object, obtaining a candidate dataset including two or more features associated with a candidate geographic object, comparing, using a computer, at least two features of the subject dataset to at least two corresponding features of the candidate dataset, at least one of the features compared comprising a geographic feature, and determining whether the candidate geographic object matches the subject geographic object based on the comparison.

23 Claims, 6 Drawing Sheets

SYSTEMS AND METHODS FOR MATCHING SIMILAR GEOGRAPHIC OBJECTS

BACKGROUND OF THE INVENTION

1. Field of the Invention

This invention relates generally to associating similar geographic objects and more particularly to matching different sets of data corresponding to similar geographic objects.

2. Description of the Related Art

Databases of information may be generated that include various types of information for various objects. For example, a geographic object database may include information relating to various geographic objects such as businesses, landmarks, streets, cities, countries or similar geographic point of interest. In some instances, a database may include, for each object of the database, a dataset that contains information relating to the object. In the context of a geographic object database, the object datasets may include information such as a name, a geographic location, a geographic shape, and other information relating to the geographic object. Often these databases of information are updated as information relating to the objects is received. For example, where additional information is received relating to the geographic object of New York City, a dataset corresponding to New York City may be updated to include the additional information received.

In some instances, datasets for an object may be identified by a unique identifier (e.g., index number) that does not have a perceivable relation to a traditional name of the object. For example, a numeric identifier for an object may be generated via application of a hash-function to the dataset associated with the object. As a result, identifiers for objects often change as new information is incorporated into the datasets. For example, where new information is added to the dataset for New York City, an identifier associated with New York City may change based on the application of a hash function to the dataset including the new information. Unfortunately, such changes in identifiers can cause confusion in matching objects in different versions of the database. For example, although New York City is still represented in old and new versions of the database, the object and dataset that represents New York City in the new database may not be apparent due to a change in the identifier associated with the object and the dataset. As a result, certain information or processes that rely on the information associated with a given object may incur issues as they cannot readily identify the object and its associated dataset. Accordingly, it is useful to match objects between the various versions of the database. Unfortunately, such a task may be exceedingly difficult due the vast number of objects and amount of information contained in the database. For example, manually sorting through and matching datasets may be virtually impossible when presented with hundreds, thousands and even millions of objects and datasets that need to be matched-up.

SUMMARY OF THE INVENTION

Various embodiments of methods and apparatus for associating different sets of data corresponding to similar geographic objects are provided herein. In some embodiments, provided is a computer-implemented method for mapping geographic objects of a second database to geographic objects of a first database. The method includes identifying a subject geographic object of the first database having an identifier for which a corresponding candidate geographic object of the second database having the same identifier has not been identified. The subject geographic object corresponding to a subject dataset including at least two of the following: a descriptor of the subject geographic object, a geographic center of the subject geographic object, and a geographic shape of the subject geographic object. The method including identifying, via comparison of the subject dataset corresponding to the subject geographic object to a plurality of candidate datasets each corresponding to a candidate geographic object of the second database, a candidate dataset including at least two of the following: a descriptor of a candidate geographic object that matches the descriptor of the subject geographic object, a geographic center of a candidate geographic object that matches the geographic center of the subject geographic object, and a geographic shape of a candidate geographic object that matches the geographic shape of the subject geographic object. The method including the subject geographic object to a candidate geographic object corresponding to the identified candidate dataset.

In some embodiments, provided is a computer-implemented method including obtaining a subject dataset including two or more features associated with a subject geographic object, obtaining a candidate dataset including two or more features associated with a candidate geographic object, comparing, using a computer, at least two features of the subject dataset to at least two corresponding features of the candidate dataset, at least one of the features compared comprising a geographic feature, and determining whether the candidate geographic object matches the subject geographic object based on the comparison.

In some embodiments, provided is a non-transitory computer readable storage medium having computer-executable program instructions stored thereon that are executable by a computer to cause steps including obtaining a subject dataset including two or more features associated with a subject geographic object, obtaining a candidate dataset including two or more features associated with a candidate geographic object, comparing, using a computer, at least two features of the subject dataset to at least two corresponding features of the candidate dataset, at least one of the features compared comprising a geographic feature, and determining whether the candidate geographic object matches the subject geographic object based on the comparison.

In some embodiments, provided is a system including a processor, a memory and an object matching module stored on the memory. The object matching module is configured to be executed by the processor to cause obtaining a subject dataset including two or more features associated with a subject geographic object, obtaining a candidate dataset including two or more features associated with a candidate geographic object, comparing, using a computer, at least two features of the subject dataset to at least two corresponding features of the candidate data set, at least one of the features compared comprising a geographic feature, and determining whether the candidate geographic object matches the subject geographic object based on the comparison.

In some embodiments, provided is a computer implemented method for matching first and second geographic entities stored in one or more geographic information systems. The method includes retrieving information about a first geographic entity and a second geographic entity from at least one of the one or more geographic information systems. The retrieved information including two or more of a name, a geographic center and a geographic area of the feature. The method including comparing the retrieve information to determine whether the first and second geographical entities match one another. The first and second geographic entity are determined to match one another if it is determined that at least one of the following conditions exists: (A) the name of the first entity matches the name of the second entity within a predetermined string edit distance and the area of the first entity overlaps the area of the second entity by at least a first amount, (B) the name of the first entity matches the name of the second entity to within a predetermined string edit distance, and the geographic centers of the first and second entities are less than a predetermined distance apart, and (C) the area of the first geographic entity overlaps the area of the second geographic entity by at least a second amount that is greater than the first amount.

DETAILED DESCRIPTION OF THE PREFERRED EMBODIMENTS

Figure 1:
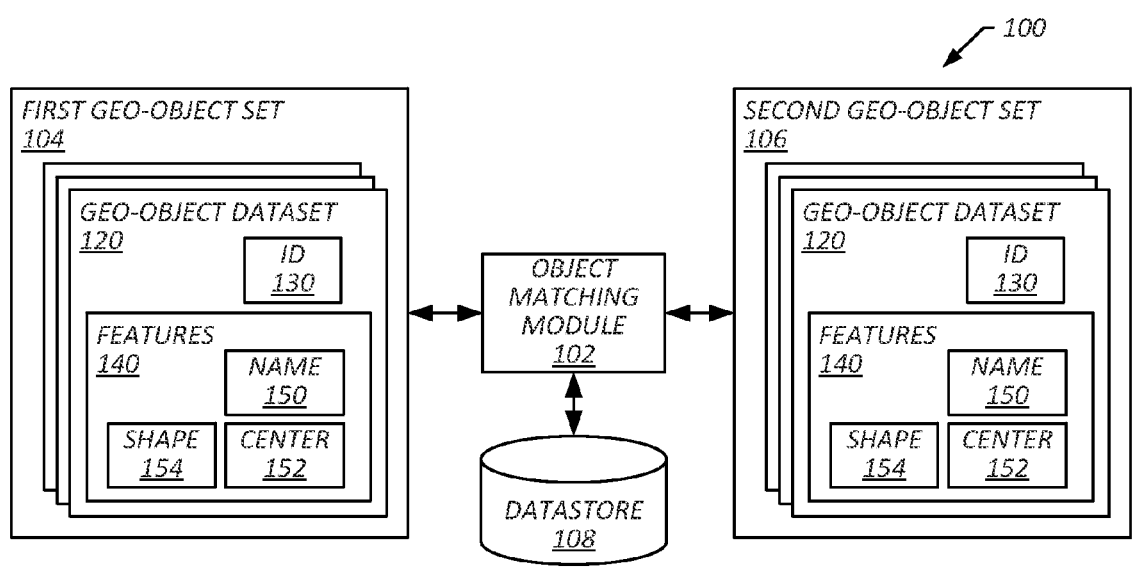
FIG. 1 is a diagram that illustrates an exemplary object matching system in accordance with one or more embodiments of the present technique.

As discussed in more detail below, provided in some embodiments are systems and methods for associating different sets of data corresponding to similar objects. In certain embodiments, the objects include geographic objects, such as businesses, landmarks, streets, cities, countries, or similar geographic point of interest. In some embodiments, a first set of data (e.g., a first database) may represent a first set of geographic objects and a second set of data (e.g., a second database) may represent a second set of geographic objects. In certain embodiments, each of the first and second datasets includes datasets that correspond to each of the geographic objects. In some embodiments, the datasets include information relating to the geographic objects, such as a name, a geographic location, a geographic shape, or the like.

In certain embodiments, at least some of the objects of the first set of objects may correspond to one or more of the objects of the second set of objects. In some embodiments, for example, a first set of data may include a database storing datasets of information relating to a set of geographic objects at a given point in time, and a second set of data may include an updated version of the database that includes information relating to the set of geographic objects at a later point in time. In certain embodiments, where, for example, information is received for a given object between a start of a week and a start of the next week, the first set of data may include a dataset that includes information for the given object known at the start of the week and the second set may include an updated dataset that includes information received during the week.

In some embodiments, two objects of two different sets of geographic objects may be matched with one another via comparison of the datasets associated therewith. In certain embodiments, two objects may be identified as matching if their datasets include matching identifiers (e.g., identifiers generated based on a hash function applied to information/features of the dataset). In some embodiments, for example, an object of a first object set may be matched with an object of a second object set if the two objects have the same or substantially similar identifiers. In certain embodiments, the objects may be identified as matching based on a comparison of features associated therewith. In some embodiments, for example, an object of a first object set may be matched with an object of a second object set if they share similar features, despite each of the objects having different identifiers. In certain embodiments, features considered in the comparison may include names, geographic centers, and/or geographic shapes/areas associated with datasets corresponding to the geographic objects. In some embodiments, for example, where two geographic objects do not include matching identifiers, the two geographic objects may be identified as matching if their names, centers and/or geographic shapes/areas are similar. In some embodiments, two objects may be identified as matching one another where at least two features are determined to be the same or similar. In certain embodiments, where two objects of different sets of objects are identified as matching, information corresponding to each of the two objects may be consolidated such that a substantially complete listing of information is generated for the matching objects. In some embodiments, similar matching and/or consolidating techniques are employed over time to iteratively build an updated set of information for objects as information is added to datasets and identifiers of the geographic objects change over time.

FIG. 1 is a diagram that illustrates an exemplary object matching system 100 in accordance with one or more embodiments of the present technique. As depicted, in some embodiments, system 100 may include an object matching module 102, a first geographic object set (e.g., first geo-object set) 104, a second geographic object set (e.g., second geo-object set) 104 and a datastore 108.

Object matching module 102 may include program instructions that are executable by a computer system to perform some or all of the functionality described herein with regard to at least system 100. For example, object matching module 102 may include an application or similar processes that provides for identifying and matching/mapping geo-object data sets 120 of first object set 104 to corresponding geo-object data sets 120 of second object set 106. In some embodiments, object matching module 102 may be implemented on a computer system similar to that of computer system 1000 described in more detail below with regard to at least FIG. 6.

First geo-object set 104 and second geo-object set 106 may each include geo-object datasets 120. Geo-object datasets 120 may each correspond to a geographic object/entity such as a place, landmark, business, street, neighborhood, city, county, state, country, and so forth. Geo-object datasets 120 may include data/information related to the geographic object corresponding thereto. In some embodiments, first geo-object set 104 and second geo-object set 106 may include geo-object datasets 120 corresponding to two different points in time. For example, first geo-object set 104 may include a given geo-object set corresponding to a given time and second geo-object set 106 may include a geo-object set that is an updated version of the geo-object set 104. Where changes are made to the geo-object datasets 120 and/or the information associated therewith, the second geo-object set 106 may reflect the changes to the geo-object datasets 120 over the period time. For example, where additional information about a given geo-object is received during the course of a week, a given geo-object dataset 120 corresponding to the given geo-object may be updated to reflect the additional information received such that first geo-object set 104 includes a geo-object dataset 120 corresponding to the given geo-object and second geo-object set 106 includes a geo-object dataset 120 corresponding to the given geo-object, including the additional information received during the week.

Each of geo-object datasets 120 may include an object identifier (ID) 130 and various features 140 (e.g., one or more attributes that define characteristics/features of an associated entity/object). For example, a given geo-object data set 120 corresponding to the geographic entity/object of New York City may include an object identifier 130 (e.g., "1843") and various features 140 that correspond to New York City (e.g., a center/location of a the city, a polygon representing the city-limits/boundary, the population of New York City and so forth). In some embodiments, object identifier 130 may uniquely identify a given geo-object dataset 120 from other geo-object datasets 120 of the geo-object set 104 and/or 106. In some embodiments, object identifier 130 may include a value indicative of one or more characteristics of the geo-object dataset 120. For example, a first geo-object dataset 120 including a given set of features 140 may include a first identifier (e.g., "12345") 130 and a second geo-object dataset 120 including a different set of features 140 may include a second identifier (e.g., "12346") 130. Accordingly, two datasets 120 corresponding to the same geo-object may have different identifiers 130 where the two datasets 120 include different features of the geo-object. For example, where additional information about the geo-object of New York City is received during the course of a week a geo-object dataset 120 of first geo-object set 104 corresponding to New York City may include a first identifier 130 of "1843" based on the information provided at the start of the week, and an updated geo-object dataset 120 of second geo-object set 106 corresponding to New York City may include a second identifier 130 of "1854" based on additional information received during the week.

In some embodiments, an identifier 130 for a given geo-object dataset 120 is generated via application of a hash-function to features 140 of the given geo-object dataset 120. For example, where a given geo-object data set 120 includes a given set of features 140 at a first time, and given geo-object data set 120 includes the same or substantially similar set of features 140 at a later time (e.g. a week later), application of the hash function may result in the geo-object data set 120 having the same identifier (e.g., "12345") 130 at the first time and the later time (e.g., the same identifier 130 at the start and end of the week). Where a given geo-object data set 120 includes a given set of features 140 at a first time, and given geo-object data set 120 includes a significantly different set of features 140 at a later time (e.g. a week later), application of the hash function may result in the geo-object data set 120 having a different identifier 130 at the first time than at the later time (e.g., a first identifier of "12345" at the start of the week and a second identifier "12346" at the end of the week).

In some embodiments, features 140 of a given geo-object dataset 120 may include information associated with the corresponding geo-object. For example, where a given geo-object dataset 120 corresponds to New York City, features may include characteristics and/or information associated with New York City. In some embodiments, features 140 may include a descriptor (e.g., name) 150, a geographic/geometric center (e.g., center) 152 and/or geographic/geometric shape 154 associated with the given geo-object corresponding to the given geo-object data set 120. In some embodiments, features 140 may include other information associated with the given geo-object corresponding to the given geo-object data set 120. For example, features 140 may include a geo-object type (e.g., business, landmark, street, city, country or the like), a population associated with the geo-object, and so forth.

In some embodiments, name 150 may include a name of the geo-object corresponding to the given geo-object data set 120. For example, where a given geo-object dataset 120 corresponds to New York City, name 150 may include "New York City", "NYC", "City of New York", "New_York_City", "NewYorkCity", "-new-york-city-" or the like.

In some embodiments, center 152 may include a geographic location indicative of a geographic center of a geo-object corresponding to the given geo-object data set 120. A center may be defined by a geometric center (e.g., centroid) of an area/region associated with the geo-object corresponding to the given geo-object data set 120. For example, where a given geo-object dataset 120 corresponds to New York City having a geographic area/region defined by its city limits, center 152 may include a geometric center of the area/region defined by the city limit boundaries of New York City. In some embodiments, center 152 may be expressed as particular geographic location/point (e.g., the location of city hall or the central post office for New York City). For example, center 152 for a geo-object data set 120 corresponding to New York City may be expressed geographic coordinates such as latitude "40.721242", longitude "−73.921509". In some embodiments, center 152 may be expressed in another form. For example, center 152 may be defined as a tile/cell that includes the location of center 152, as discussed in more detail below.

In some embodiments, shape 154 may include one or more geographic regions/areas associated with a geo-object corresponding to the given geo-object data set 120. Shape 154 may be defined by boundaries of a geographic area/region associated with the geo-object corresponding to the given geo-object data set 120. For example, where a given geo-object dataset 120 corresponds to New York City having a geographic area/region including a boundary defined by the city limits of New York City, shape 154 may include a polygon that at least approximates the city limits of New York City. In some embodiments, shape 154 may be defined by a series of points, edges/lines, curves or the like that define an exact boundary or at least the approximate boundary of the shape. For example, where a given geo-object dataset 120 corresponds to New York City having a geographic area/region bounded by the city limits of New York City, shape 154 may be defined by a series of points, lines, and/or curves, that at least approximately follow the city limits of "New York City" to define shape 154.

In some embodiments, shape 154 may be defined by a given set of tiles/cells that correspond to the geographic area/region associated with the geo-object corresponding to the given geo-object data set 120. For example, where the surface of the earth is segmented into a grid of tiles/cells (e.g., two-kilometer by two-kilometer tiles/cells), shape 154 may be defined by a listing of the tiles/cells that fall completely, or at least partially, within the boundary of shape 154. Where a given geo-object dataset 120 corresponds to New York City having a geographic area/region of approximately 790 km² as defined by its city limits, shape 154 may include a listing of approximately two-hundred, two-kilometer×two-kilometer (2 km×2 km) square tiles/cells that fall within the city limits of New York City. As descried in more detail below, in some embodiments, shape 154 (and/or an area/region associated therewith) may be defined by an internal covering of tiles/cells (e.g., the tiles/cells that fall completely within the geographic boundary of the geo-object). For example, an area of New York City may be defined by all of the 2 km×2 km tiles/cells having their area falling completely within the city limits of New York City. In some embodiments, shape 154 (and/or an area/region associated therewith) may be defined by an external covering of tiles/cells (e.g., the tiles/cells that fall at least partially within the geographic boundary of the geo-object). For example, an area of New York City may be defined by all of the 2 km×2 km tiles/cells that have at least a portion of their area falling within the city limits of New York City.

Figure 2A:
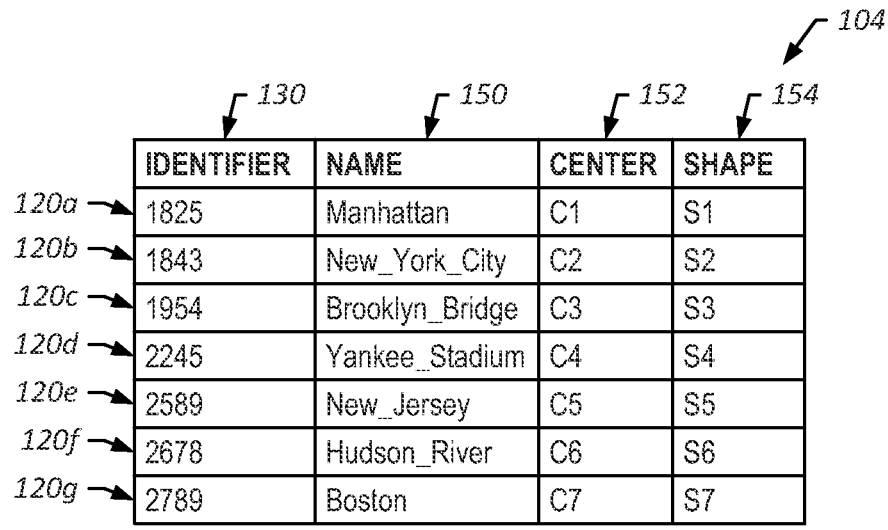
FIGS. 2A and 2B are tables depicting exemplary representations of first and second geo-object sets, respectively, in accordance with one or more embodiments of the present technique.
Figure 2B:
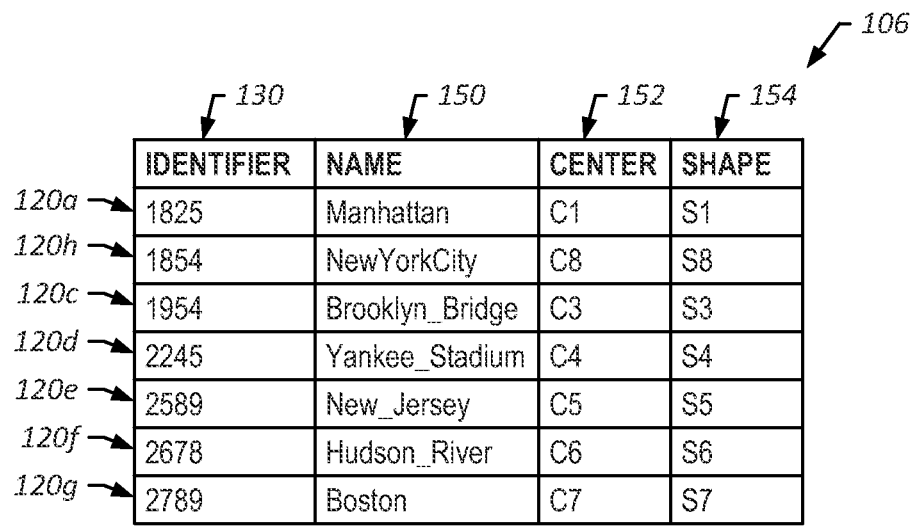

FIGS. 2A and 2B are tables depicting exemplary representations of first and second geo-object sets 104 and 106, respectively, in accordance with one or more embodiments of the present technique. First geo-object set 104 includes geo-object data sets 120a-120g corresponding to "Manhattan", "New_York_City", "Brooklyn_Bridge", "Yankee_Stadium", "New_Jersey", "Hudson_River" and "Boston". Second geo-object set 104 includes similar geo-object data sets 120. However, second geo-object set 104 does not contain a geo-object data set 120 corresponding directly to geo-object data set 120b. For example, second geo-object set 106 does not include entry having an identifier "1843" and/or the exact name "New_York_City". In contrast, second geo-object set 104 contains a geo-object data set 120h. Notably, identifier 130, name 150, center 152 and/or shape 154 of geo-object dataset 120h may be different from that of geo-object dataset 120b. In some embodiments, the notation "CN" may be indicative of a given geographic location of center 152 associated with a given geo-object. For example, "C1" may be representative of a set of geographic coordinates indicative of a geometric center of "Manhattan" or the like. In some embodiments, "SN" may be indicative of a given geographic shape associated with a given geo-object. For example, "S1" may be representative of a polygon indicative of a geographic boundary of Manhattan, a listing of tiles/cells associated with the geographic region/area of Manhattan, or the like.

As discussed above, first geo-object set 104 may be indicative of a geo-object set at a given time and second geo-object set 106 may include the same or similar geo-object set at a later time (e.g. a week later). The absence of geo-object dataset 120b and the addition of geo-object dataset 120h may be reflective of changes to the underlying data (e.g., features 140) of one or more geo-object datasets 120 between the first and second time periods. For example, additional information about New York City may have been received during the course of the week, and the geo-object dataset 120 corresponding to New York City may be updated to reflect the additional information received. As noted above, the changes to the underlying information (e.g., features 140) of the geo-object dataset 120 corresponding to New York City may have effectuated a change in identifier 130 of the geo-object dataset 120 associated with New York City. For example, as new information relating to New York City (e.g., an updated name, an updated center, and updated shape, updated population, updated weather data, and/or other information) was received by system 100 this information may have been added to or otherwise consolidated with features 140 of geo-object data set 120b. At some point, the amount of information added to or otherwise consolidated with features 140 of geo-object data set 120b may have generated a sufficient change in the underlying data to effectuate a change in identifier 130. For example, application of a hash-function to the features associated with entry 120b generates an identifier of "1843", and application of the hash-function to the features associated with entry 120h generates an identifier of "1854".

In some embodiments, underlying changes to features 140 of a geo-object dataset 120 may be the result of additional information received, information removed, changes to information, and so forth. For example, where a given geo-object dataset 120 corresponds to New York City and feeds of feature information relating to New York City are received or otherwise accessible from multiple sources, the feature information may be substantially changed if one of the sources is no longer available, if a new source of information is added and/or if a source provides changes or other updates to the feature information for the object.

In some embodiments, the changes to the underlying data (e.g., features 140) and the resulting changes to the identifier 130 may create complications in maintaining consistencies between geo-object datasets. For example, although a given geo-object dataset 120 associated with a given geo-object (e.g., New York City) and a given identifier (e.g., "1843") is present in a geo-object set one week, the following week, changes to the underlying data/information (e.g., features 140) associated with the given geo-object dataset 120 may cause a new identifier to be generated (e.g., "1854"). The new identifier may not match the original identifier such that the geo-object dataset 120 for the given geo-object may seem to disappear from the geo-object set at the end of the week. Where a database of information is organized based on identifiers, this may inhibit associating the new geo-object dataset (e.g., object dataset 120h) having the new identifier (e.g., "1854") with the old geo-object dataset (e.g., geo-object dataset 120b) having the old identifier (e.g., "1843") even where they correspond to the same geo-object (e.g., New York City). Although certain features 140 may appear to match (e.g., name 150), uncertainty may still remain as to whether or not the two geo-object datasets (e.g., geo-object datasets 120a and 120b) do in fact correspond to the same geo-object and, thus, match one another.

In some embodiments, geo-object datasets 120 may be associated with various sets of information. For example, in the context of geolocation, Internet Protocol (IP) addresses may be mapped to a given identifier 130. In some embodiments, upon receiving a query for location information associated with a given IP-address, a geolocation provider may locate the identifier 130 mapped to the given IP-address, access features 140 of the geo-object dataset 120 corresponding to the identifier 130, determine a geolocation corresponding thereto, and provide the geolocation data in response to the query. In some embodiments, the geolocation data may be employed by a content provider to identify the location of a user associated with the IP-address and the location may be employed to identify targeted content to be provided to the user (e.g., news, maps, advertisements and so forth, directed to users in the given geolocation). Where an identifier changes, the IP-address previously mapped to the identifier may no longer be mapped to the new identifier. For example, IP-addresses mapped to identifier "1843" corresponding to New York City may no longer be mapped to a geo-object dataset 120 of geo-object set 106. Assuming that the geo-object is still present, and has not disappeared (e.g., that New York City still exists), it may be necessary to identify a new identifier (e.g., identifier "1854") corresponding to the geo-object such that the IP-addresses previously mapped to the old identifier (e.g., identifier "1843") can be mapped to the new identifier (e.g., identifier "1854"). In some instances, the dynamic nature of IP geolocation may provide for some or all of the IP-address to be mapped to the new identifier even before the mapping/matching of the new and old identifiers is performed. For example, where one-thousand IP-addresses are mapped to identifier "1843", other geolocation techniques may be employed to associate six-hundred of the one-thousand IP-addresses to the identifier "1854" throughout the course of the week.

In some embodiments, geo-object datasets 120 are compared based on various criteria to establish a match/mapping between two or more geo-object datasets that correspond to the same or similar geo-object. For example, in some embodiments, features such as the name 150, center 152 and/or shape 154 of geo-object datasets 120 are compared to establish whether or not two geo-object datasets 120 match (e.g., whether the geo-object data sets correspond to the same geo-object).

Name Matching

In some embodiments, comparison of names may involve determining at least a level of similarity between two names. For example, where geo-object dataset 120b is being compared to geo-object data set 120h, comparison of names 150 may involve determining a similarity between the names "New_York_City" and "NewYorkCity". In some embodiments, the comparison may be based at least in part on a string-edit distance. The string-edit distance between two strings of characters may include the number of operations required to transform one of the strings into the other string. Operations may include replace, delete, insert, substitute, transpose, and so forth. In some embodiments, the string-edit distance may be determined based on various algorithms, such as Levenshtein distance, Hamming distance, Damerau-Levenshtein distance, Jaro-Winkler distance, and so forth. For example, with regard to comparing the names "New_York_City" and "NewYorkCity" of geo-object datasets 120b and 120h based on application of Levenshtein distance techniques, a string edit distance of "2" may be determined based on the deletions/additions of the two underscore characters to generate the same strings. As a further example, with regard to comparing the names "New_York_City" and "Manhattan" of geo-object datasets 120b and 120a based on application of Levenshtein distance techniques, a string edit distance of "13" may be determined.

In some embodiments, names may be canonicalized to convert the names into a standard form that facilitates comparison with other names represented in the same or similar form. For example, spaces may be dropped, accents may be removed, characters may be removed and so forth. In some embodiments, for example, the names "New York City" and "New_York_City" may both be canonicalized to the name "NewYorkCity". In some embodiments, the canonicalized versions of the names may be compared to identify a corresponding sting edit distance.

In some embodiments, the similarity of two names may be expressed as a percentage or similar value (e.g., string edit equality). String edit equality may be defined by the following Equation (1):

$$SEeq = \left(1 - \frac{SED}{TNC}\right) * 100\% \quad (1)$$

Where, "SEeq" is the String Edit Equality expressed as a percentage, "SED" is the string edit distance (e.g., as determined using one of the techniques described above), and "TNC" is a total number of characters.

In some embodiments, the total number of characters (TNC) may include the total number of characters and spaces in the two strings being compared. For example, the names "New_York_City" and "NewYorkCity" of geo-object datasets 120b and 120h may be determined to have "24" total characters. Thus, based on the string edit distance of "2" and the "24" total characters, the string edit equality may be determined to be about 92% (e.g., (1−(2/24))*100%). As a further example, with regard to the names "New_York_City" and "Manhattan" of geo-object datasets 120b and 120a having "22" total characters and string edit distance of "13", the string edit equality may be determined to be about 41% (e.g., (1−(13/22))*100%).

In some embodiments, the total number of characters (TNC) may include the total number of characters and spaces in the longest of the two strings being compared. For example, with regard to the names "New_York_City" and "NewYorkCity" of geo-object datasets 120b and 120h the longest of the two names/strings (e.g., "New_York_City") may be determined to have a length of "13" total characters. Thus, based on the string edit distance of distance of "2" and the "13" total number of characters in the longest of the two strings being compared, the string edit equality may be determined to be about 85% (e.g., (1−(2/13))*100%). As a further example, with regard to the names "New_York_City" and "Manhattan" of geo-object datasets 120b and 120a having a string edit distance of "13" and "13" total characters in the longest of the two strings being compared, the String Edit Equality may be about 0% (e.g., (1−(13/13))*100%).

In some embodiments, whether or not two names are considered to match may be based on whether or not the string edit distance and/or the string edit equality satisfies a corresponding string edit threshold. In some embodiments, the string edit threshold may include a given value. The string edit distance may have to be less than or equal to the string edit threshold value in order to determine that the two names under consideration match. For example, where the string edit threshold has a value of "5", the two names "New_York_City" and "NewYorkCity" of geo-object datasets 120b and 120h may be determined to match based on the corresponding string edit distance of "2", as discussed above. In contrast, where the string edit threshold has a value of "5", the two names "New_York_City" and "Manhattan" of geo-object datasets 120b and 120a may be determined to not match based on the corresponding string edit distance of "13", as discussed above.

In some embodiments, the string equality threshold value may include a given percentage value. The string edit equality may have to be greater than or equal to the string edit threshold value in order to determine that the two names under consideration match one another. For example, where the string edit threshold has a value of "85%", the two names "New_York_City" and "NewYorkCity" of geo-object datasets 120b and 120h may be determined to match based on a corresponding string edit equality of about 92%, as discussed above. In contrast, where the string edit threshold has a value of "85%", the two names "New_York_City" and "Manhattan" of geo-object datasets 120b and 120a may be determined to not match based on a corresponding a string edit equality of about 0%, as discussed above.

Center Matching

In some embodiments, comparison of centers 152 may involve determining whether or not two centers are proximate one another (e.g., match one another). For example, where geo-object dataset 120b is being compared to geo-object data set 120h, comparison of centers 152 may involve determining whether or not the geographic location of center "C2" is proximate the geographic location of center "C8". In some embodiments, centers 152 may be determined to match where they are within a given distance (e.g., radius) of one another.

For example, where a center distance threshold has a value of four kilometers, two centers 152 may have to be within a distance of four kilometers or less of one another to be determined to match. In some embodiments, a center distance threshold may be expressed in terms of numbers of tiles/cells (e.g., a value of one cell) as discussed below.

Figure 3:
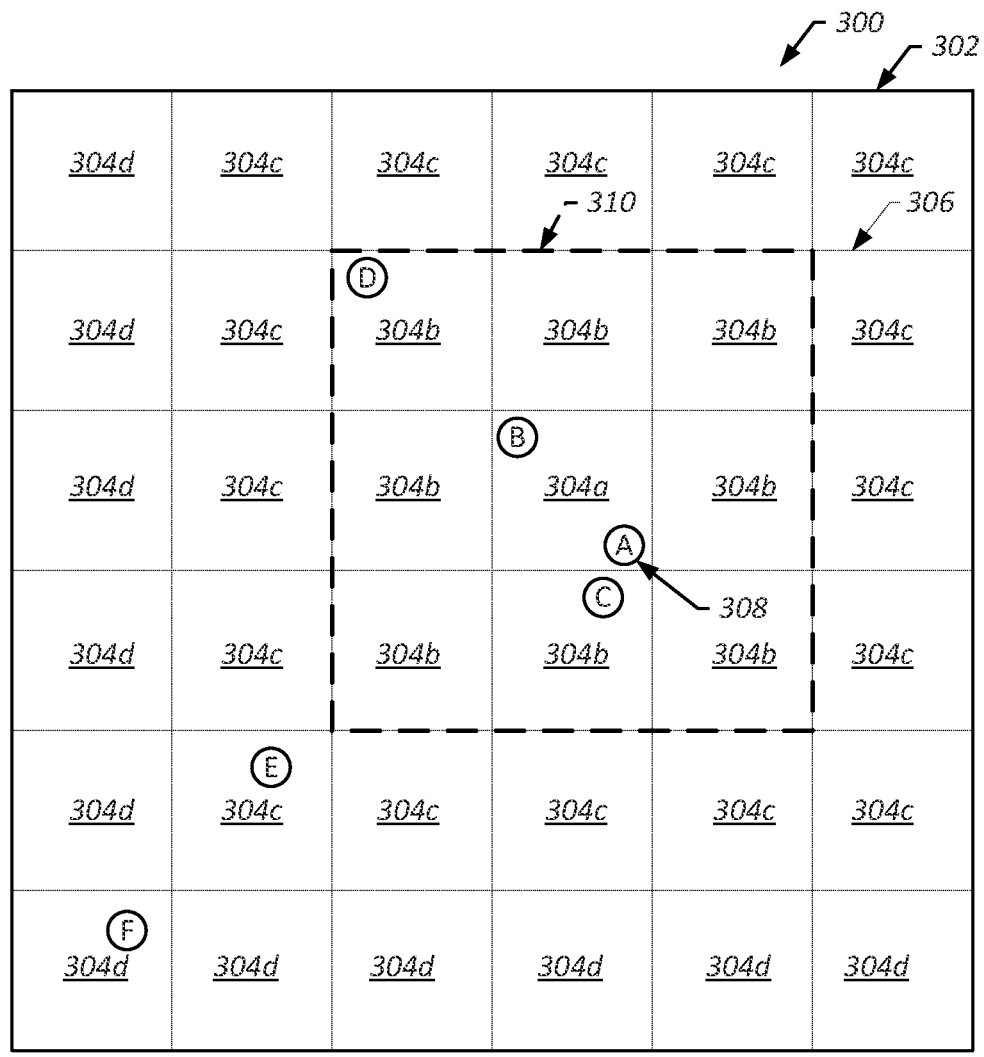
FIG. 3 is a diagram that illustrates a geographic mapping depicting geographic locations in accordance with one or more embodiments of the present technique.

FIG. 3 is a diagram that illustrates a geographic map 300 depicting geographic locations (e.g., centers) in accordance with one or more embodiments of the present technique. Map 300 may include a two-dimensional mapping of a given geographic region 302 (e.g., a geographic mapping of some or the entirety of the earth's surface). Region 302 may be segmented into tiles/cells 304a-304c (collectively referred to as tiles/cells 304) as defined by grid 306. The tiles/cell of a given level may be of approximately the same size and shape. For example, in the illustrated embodiment, each of tiles/cells 304 may be of the same level, representing an approximately four-kilometer by four-kilometer square geographic sub-region. Tiles/cells 304 may be any other suitable sizes and/or shapes. In some embodiments, tiles of a given level may be contained within higher-level cells of a larger size (e.g., the tiles may be children of larger cells). For example, a higher-level cell (e.g., parent cell) of approximately eight-kilometers by eight-kilometers may include four quadrants that are each defined by a given one of tiles/cell 304. In some embodiments, tiles of a given level may contain lower-level cells of a smaller size (e.g., the tiles may be parents of smaller cells). For example, tiles/cell 304 may each include four quadrants that are each defined by a lower-level cell (e.g., child cell) of approximately two-kilometers by two-kilometers. Each of the higher-level cells may be children of even higher-level cells (e.g., ancestors of tiles/cells 304) and so forth, and/or each of the lower-level cells may be parents of even lower-level cells (e.g., descendants of tiles/cells 304) and so forth. In some embodiments, geographic locations 308 (e.g., "A"-"F") may be indicative of geographic locations corresponding to one or more centers 150 of geo-object datasets 120. Location "A" is located in a tile/cell 304a, having adjacent tiles/cells 304b (e.g., tiles/cells 304b within one tile/cell 304 of tile/cell 304a containing location "A"), as denoted by dashed box 310. Tiles/cells 304c are within two tiles/cells 304 of tile/cell 304a, and tiles/cells 304d are within three tiles/cells 304 of tile/cell 304a. Location "B" is located a distance greater than four kilometers from location "A", and location "B" is in the same tile/cell 304a as location "A". Location "C" is located within four kilometers of location "A", location "C" is not in the same tile/cell 304 as location "A", and location "C" is located within a tile/cell 304b adjacent tile/cell 304a containing location "A". Location "D" is located a distance greater than four kilometers from location "A", location "D" is not in the same tile/cell 304 as location "A", and location "D" is located within a tile/cell 304b adjacent tile/cell 304a containing location "A". Locations "E" and "F" are located a distance greater than four kilometers from location "A", locations "E" and "F" are not in the same tile/cell 304 as location "A", and locations "E" and "F" are not located within a tile/cell 304b adjacent the tile/cell 304a containing location "A" (e.g., locations "E" and "F" are located in tile/cell 304c and 304d that are two and three tiles/cells 304, respectively, away from tile/cell 304a containing location "A").

Accordingly, where criteria for comparing centers of geo-object datasets 120 requires that two centers must be within four kilometers of one another to be considered matching, of locations "B" through "E", only location "C" would be determined to match location "A" as location "C" is the only location that is within four kilometers of location "A".

In some embodiments, centers may be canonicalized to provide a representation of the center in a standard form to facilitate comparison with other centers represented by the same or similar form. For example, centers may be associated with a given tile/cell. With regard to FIG. 3, center "A" may be canonicalized into association with tile 304a.

In some embodiments, centers may be considered to match where they are both located within the same tile/cell on a geographic mapping (e.g., a center distance threshold of zero cells). For example, two centers may have to be located within in the same tile/cell 304 for the centers to be determined to match. With regard to locations "A" of FIG. 3, location "B" may be determined to match location "A" as the locations each fall within the same tile/cell 304a.

In some embodiments, centers may be considered to match where they are within a given number of tiles/cells of one another on a geographic mapping. For example, two centers may have to be located within one tile of one another (e.g., in the same tile/cell 304 or adjacent tiles/cells 304) for the centers to be determined to match (e.g., a center distance threshold of one cell). With regard to locations "A" of FIG. 3, locations "B", "C" and "D" may be determined to match location "A" as they each fall within the same tile/cell 304a or a tile/cell 304b adjacent tile/cell 304a containing location "A". Notably, locations "E" and "F" may be determined to not match location "A" as they are located in tiles/cells 304c and 304d located two and three tiles/cells 304, respectively, from tile/cell 304a containing location "A".

Where location "A" is representative of the geographic location of center "C2" of geo-object dataset 102b and location "C" is representative of the geographic location of center "C8", centers "C2" and "C8" may be determined to match where two centers have to be located within four kilometers and/or one tile/cell of one another to be determined to match. Where location "A" is representative of the geographic location of center "C2" of geo-object dataset 102e and location "E" or "F" is representative of the geographic location of center "C8", centers "C2" and "C8" may be determined to not match where two centers have to be located within four kilometers and/or within one tile/cell of one another to be determined to match.

Although certain embodiments described herein are based on cells of the same level, in some embodiments, a measurement of relative distance between centers may be based on tiles/cells of varying levels. For example, centers may be determined to match where they are both located within the same parent/child tile/cell (e.g., a tile/cell that is one level higher/lower than tile/cells 304). Moreover, relative distance between centers may be measured based on the number of parent/child tiles/cells of separation.

Shape Matching

In some embodiments, comparison of shapes may involve determining whether or not the shapes sufficiently overlap one another. For example, where geo-object dataset 120b is being compared to geo-object data set 120h, comparison of shapes may involve determining whether or not at least a given percentage of the respective shapes 154 of geo-object datasets 120b and 120h overlap one another. If a sufficient percentage of the shapes' area overlap, the shapes may be considered to match one another.

In some embodiments, shapes of objects may be canonicalized to provide a representation of the shape in a standard form to facilitate comparison with other shapes of the same or similar form. For example, as discussed in more detail below, a given shaped may be represented by a set of tiles/cells that provide a covering (e.g., internal or external covering) of the shape.

Figure 4A:
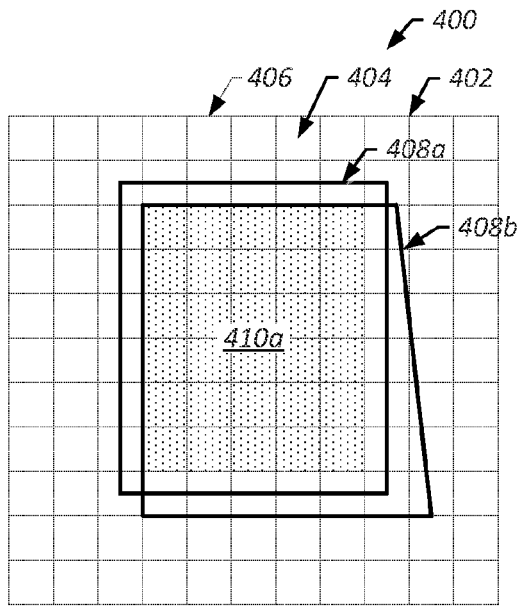
FIGS. 4A-4D are diagrams that illustrate geographic mappings including overlapping shapes in accordance with one or more embodiments of the present technique.
Figure 4B:
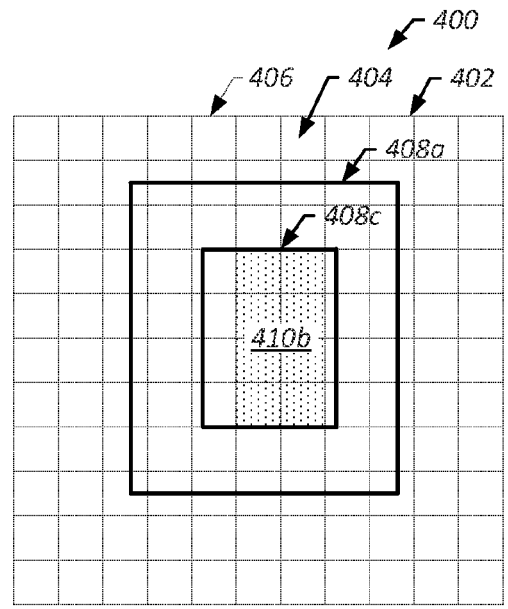
Figure 4C:
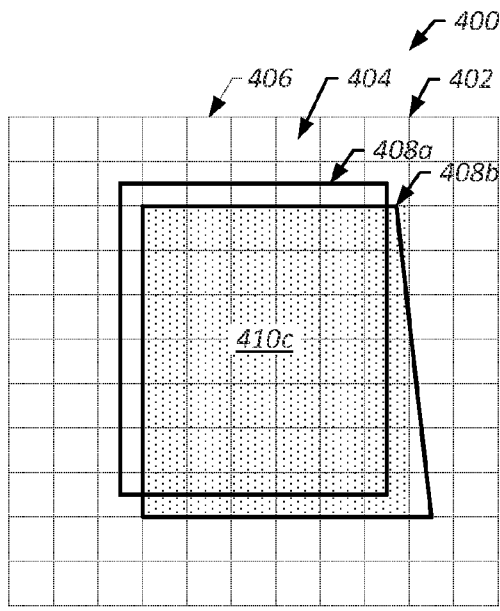
Figure 4D:
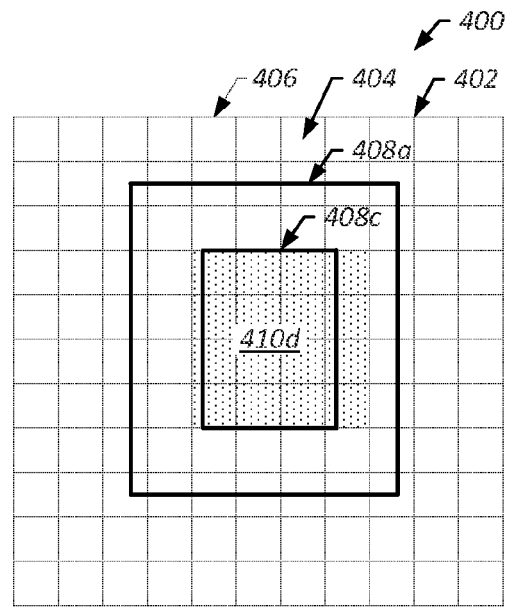

FIGS. 4A-4D are diagrams that illustrate geographic mappings 400 including overlapping shapes in accordance with one or more embodiments of the present technique. Mapping 400 may include a two-dimensional mapping of a given region 402. Region 402 may be segmented into tiles/cells 404 as defined by grid 406. In some embodiments, tiles/cells 404 may be representative of approximately two-kilometer by two-kilometer square geographic regions. Boundaries 408a, 408b and 408c may define geographic shapes corresponding to shapes 154 of geo-object datasets 120b, 120h and 120a, respectively. Each of FIGS. 4A and 4B depict shapes with varying amounts of overlap (e.g., the shaded tiles) based on internal covering techniques. Each of FIGS. 4C and 4D depicts shapes with varying amounts of overlap (e.g., the shaded tiles) based on external covering techniques.

In some embodiments, a percentage of overlap may be based on an area of overlap relative to a total area of the objects overlapping one another. An overlap percentage may be defined by the following equation (2):

$$PO = \left(\frac{2*OA}{TOA}\right)*100\% \quad (2)$$

Where, "PO" is the percent overlap expressed as a percentage, "OA" is the overlapping area, and "TOA" is the total object area. Where two objects are being compared, overlap area may include the overlapping area between the two objects, and the total object area may include the total area of the two objects. Accordingly, where two objects each have a geographic area of two square kilometers with one-square kilometer overlapping, the shapes/objects may have a 50% overlap (e.g., $(2*1 \text{ km}^2/(2 \text{ km}^2 + 2 \text{ km}^2))*100\% = 50\%$).

In some embodiments, percentage overlap may be based on the actual area of two objects and the actual area of the overlapping portion of the objects. For example, referring to FIG. 4A boundaries 408a and 408b may each define a geographic area of about 168 km² (e.g., about "42" 2 km by 2 km square tiles/cells 404) and having an overlap of about 143 km² (e.g., about "35.75" tiles/cells 404). Accordingly, the shapes/objects defined by boundaries 408a and 408b of FIG. 4A may have an overlap of about 85% (e.g., (2*143/(168+168))*100%=85%) based on the actual area of two shapes/objects and the actual area of the overlapping portions of the shapes/objects.

In some embodiments, percentage overlap may be based on the number/amount of overlapping tiles/cells. For example, the shapes/objects defined by boundaries 408a and 408b of FIG. 4A may have an overlap of about 85% (e.g., (2*35.75/(42+42))*100%=85%) based on the number of overlapping tiles. In some embodiments, tiles associated with a shape and, thus, the overlapping portion of the shapes/objects, may be based on an internal covering of the given shapes/objects by corresponding tiles/cells. An internal covering of an object/shape may be defined by tiles/cells that are completely contained within the boundary of the shape/object/overlap (e.g., a tile/cell having the entirety of its area falling within the boundary of a shape associated with the object). For example, referring to FIG. 4A, employing internal covering, boundary 408a may define a geographic area of thirty tiles/cells 404, boundary 408b may define a geographic area of thirty-nine tiles/cells 404, and an overlap of thirty tiles/cells 404, as depicted by hatched region 410a. Accordingly, the shapes/objects defined by boundaries 408a and 408b of FIG. 4A may have an overlap of about 87% based on internal covering (e.g., (2*30/(30+39))*100%=87%).

Referring to FIG. 4B, employing internal covering, boundary 408a may define a shape/object having a geographic area defined by thirty tiles/cells 404, boundary 408c may define a shape having a geographic area of eight tiles/cells 404 and an overlap of eight tiles/cells 404, as depicted by hatched region 410b. Accordingly, the shapes/objects defined by boundaries 408a and 408c of FIG. 4B may have an overlap of about 42% based on internal covering (e.g., (2*8/(30+8))*100%=42%).

In some embodiments, tiles associated with a shape and, thus, the overlapping portion of the shapes/objects, may be based on an external covering of the given shapes/objects by corresponding tiles/cells. An external covering of a shape may be defined by the tiles/cells that are at least partially contained within the boundary of the shape/object/overlap (e.g., a tile/cell having at least a portion of its area falling within the boundary of a shape associated with the object). For example, referring to FIG. 4C, employing external covering, boundary 408a may define a shape/object having a geographic area defined by fifty-six tiles/cells 404, boundary 408b may define a shape/object having a geographic area of fifty-four tiles/cells 404 and boundaries 408a and 408b may define an overlap of forty-two tiles/cells 404, as depicted by hatched region 410c, such that the shapes/objects defined by boundaries 408a and 408b may have an overlap of about 76% based on external covering (e.g., (2*42/(56+54))*100%=76%).

Referring to FIG. 4D, employing external covering, boundary 408a may define a shape/object having a geographic area defined by fifty-six tiles/cells 404, boundary 408c may define a shape/object having a geographic area of sixteen tiles/cells 404 and, as depicted by hatched region 410d, an overlap of sixteen tiles/cells 404 such that the shapes/object defined by boundaries 408a and 408c may have an overlap of about 44% based on external covering (e.g., (2*16/(56+16))*100%=44%).

Although certain embodiments described herein are based on tiles/cells of the same level, in some embodiments, a measurement of overlap may be based on tiles/cells of varying levels. For example, objects may be associated with child/parent tiles/cells of tiles/cells 404 and, thus, an overlap for the objects may be based on child/parent tiles/cells of tiles/cells 404.

In some embodiments, shapes of two geo-objects may be determined to match where they have an overlap that satisfies (e.g., exceeds) a given threshold overlap value (e.g., a threshold overlap percentage). For example, the shapes of two geo-object may be determined to match where they have to have an overlap percentage of 85% or greater. Embodiments may include any suitable overlap threshold overlap value/percentage, such as 100%, 99%, 98%, 97%, 96%, 95%, 90%, 85%, 80%, 75%, 70%, 65% or less. Based on an overlap threshold percentage of 85%, with regard to FIGS. 4A-4D, the shapes defined by boundaries 408a and 408b of FIGS. 4A and 4C based on actual area may be determined to match based on a determined overlap of 85%, the shapes/objects defined by boundaries 408a and 408b of FIG. 4A having an overlap of about 87% based on internal covering may be determined to match, the shapes/objects defined by boundaries 408a and 408c of FIG. 4B having an overlap of about 42% based on internal covering may be determined to not match, the shapes/objects defined by boundaries 408a and 408b of FIG. 4C having an overlap of about 76% based on external covering may be determined to not match, and the shapes/objects defined by boundaries 408a and 408b of FIG. 4D having an overlap of about 44% based on external covering may be determined to not match. In some embodiments, boundary 408a may correspond to shape "S2" of geo-object dataset 120*b*, boundary 408*b* may correspond to shape "S8" of geo-object dataset 120*h* and boundary 408*c* may correspond to shape "S1" of geo-object dataset 120*a*, as discussed in more detail below.

Figure 5:
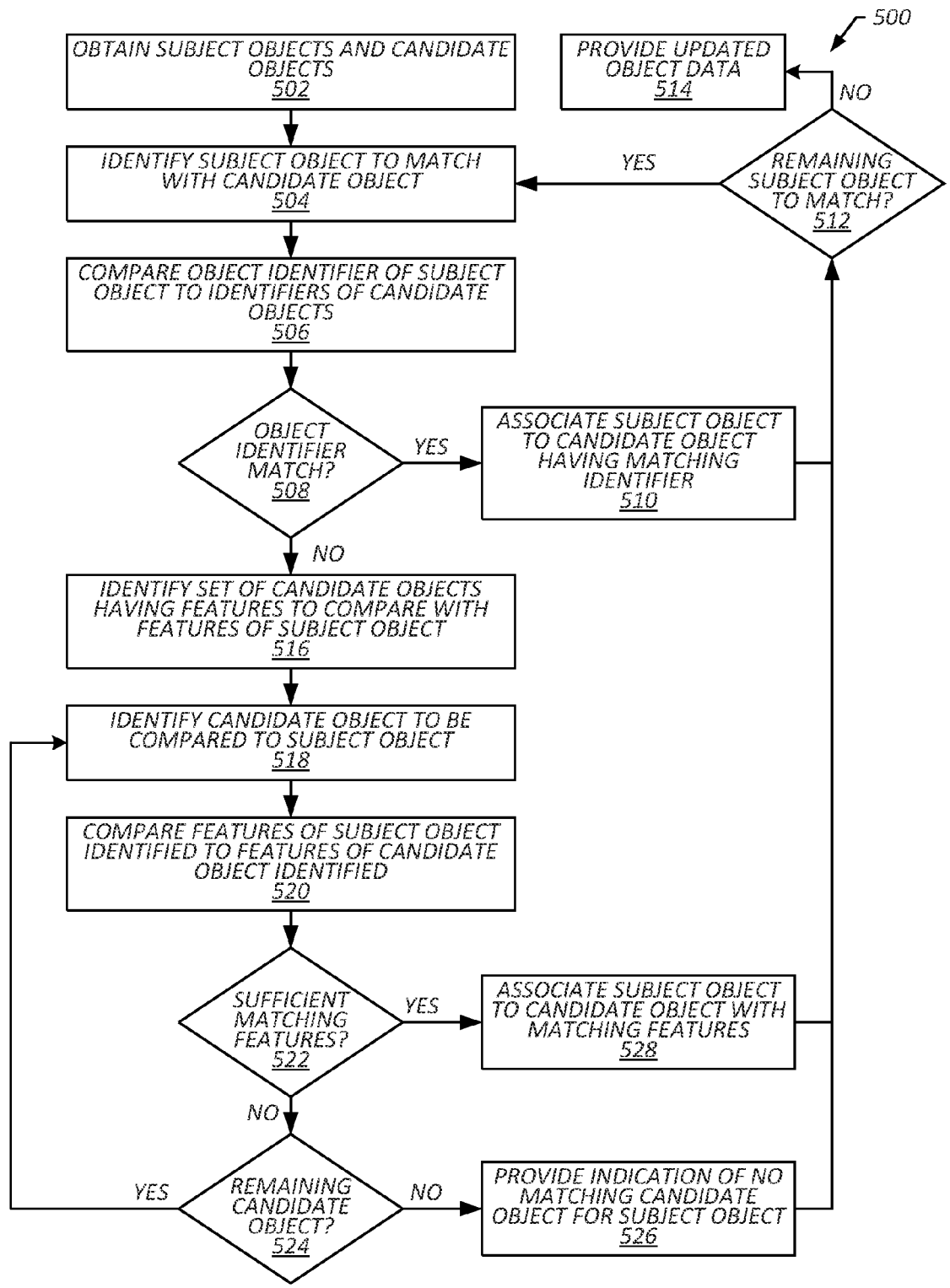
FIG. 5 is a flowchart that illustrates a method of associating similar geographic objects in accordance with one or more embodiments of the present technique.

FIG. 5 is a flowchart that illustrates a method 500 of associating (e.g., matching) similar geo-objects in accordance with one or more embodiments of the present technique. In some embodiments, method 500 may be employed to match or otherwise associate geo-objects and/or their corresponding geo-object datasets of a first set of geo-objects (e.g., a first database of geo-objects) with geo-objects and/or their corresponding geo-object datasets of a second set of geo-objects (e.g., a second database of geo-objects). For example, where geo-object set 104 is modified over the course of a week, resulting in geo-object set 106, method 500 may provide for matching geo-objects and corresponding datasets 120 of a geo-object set 104 at the start of the week, with geo-objects and corresponding datasets 120 of a corresponding geo-object set 106 at the end of the week to account for changes in underlying features/data throughout the course of the week.

Method 500 may generally include obtaining subject and candidate objects, identifying a given subject object to be matched with a candidate object, comparing the object identifier of the subject object to identifiers of candidate objects to determine whether the identifier of the given subject object matches the identifier of at least one of the candidate objects and, if so, associating the subject object with the candidate object having the matching identifier and determining whether or not another subject node needs to be matched. If the identifier of the given subject object does not match the identifier of at least one of the candidate objects, the method may include identifying a set of candidate objects having features for comparison with features of the subject object, identifying a candidate object of the set of candidate objects to be compared to the subject object, comparing the features of the subject object to the candidate object (e.g., via comparison of at least two of names, centers and/or shapes) to determine whether there are a sufficient matching features of the subject object and the candidate object being compared and, if so, associating the subject object to the candidate object having sufficient matching features and determining whether or not another subject node needs to be matched. If there are not sufficient matching features of the subject object and the candidate object being compared, the method may include determining whether any candidate objects of the set of candidate object remain for comparison to the subject object and, if so, identifying a candidate object remaining and repeating the comparison of features of the subject node to the identified candidate object. If no candidate objects of the set of candidate object remain for comparison to the subject object, providing an indication that there appears to be no matching candidate object for the subject object and determining whether or not another subject node needs to be matched. The method processing steps may be repeated for some, substantially all, or all of the subject objects of the subject object set. For example, method 500 may be employed to attempt to identify a match for some, substantially all, or all of the geo-objects of first geo-object data set 104 with a corresponding geo-object of second geo-object data set 106.

Method 500 may include obtaining subject and candidate objects, as depicted at block 502. Obtaining subject objects may include retrieving or otherwise obtaining one or more geo-objects (e.g., subject geo-objects) and/or corresponding geo-object datasets (e.g., subject geo-object datasets) 120 of first geo-object set (e.g., subject geo-object set) 104 from datastore 108 and/or another source. Obtaining candidate objects may include retrieving or otherwise obtaining one or more geo-objects (e.g., candidate geo-objects) and/or corresponding geo-object datasets (e.g., candidate geo-object datasets) 120 of second geo-object set (e.g., candidate geo-object set) 106 from datastore 108 and/or another source. In some embodiments, subject geo-object set 104 may include corresponding geo-object datasets 120 based on a given time and candidate geo-object set 106 may include corresponding geo-object datasets 120 based on a subsequent time. For example, where geo-object datasets are compared on a weekly basis, subject geo-object set 104 may include corresponding geo-object datasets 120 based on a Monday and candidate geo-object set 106 may include corresponding geo-object datasets 120 based on the following Monday, taking into account changes in underlying features/data throughout the course of the week.

Method 500 may include identifying a subject object to match with a candidate object, as depicted at block 504. Identifying a subject object to match with a candidate object may include identifying one or more of the subject geo-objects of subject geo-object set 104 that have not yet been matched and/or previously considered for matching with a candidate geo-object of candidate geo-object set 106. In a first iteration, where none of the subject geo-objects of subject geo-object set 104 have been matched and/or previously considered for matching with a subject geo-object of candidate geo-object set 106, anyone of the subject geo-objects of subject geo-object set 104 may be selected/identified. For example, a "Manhattan" geo-object corresponding to geo-object dataset 120*a* of subject geo-object set 104 may be selected/identified to be matched.

Method 500 may include comparing an object identifier of the subject object to identifiers of candidate objects, as depicted at block 506. Comparing an object identifier of the subject object to identifiers of candidate objects may include comparing an identifier 130 of the geo-object dataset 120 corresponding to the subject geo-object of subject geo-object set 104 selected/identified at block 504 to one, some, substantially all, or all of the identifiers 130 of the geo-object datasets 120 of candidate geo-object set 106 to determine whether or not a candidate geo-object exists having a same or similar identifier 130 as the identifier 130 corresponding to the subject geo-object (e.g., a matching identifier). For example, identifiers 130 of geo-object datasets 120 of candidate geo-object set 106 may be searched to locate an identifier that matches identifier 130 of "1825" corresponding to geo-object dataset 120*a* of subject geo-object set 104 and the "Manhattan" geo-object selected/identified at block 504. Based on the comparison/search, method 500 may include determining whether or not a candidate object has an identifier that matches the identifier of the subject geo-object, as depicted at block 508. For example, it may be determined that geo-object dataset 120*a* of candidate object-set 106 has an identifier 130 of "1825" that exactly matches identifier 130 of "1825" corresponding to geo-object dataset 120*a* of subject geo-object set 104 and the "Manhattan" geo-object selected/identified at block 504. In some embodiments, the comparison may be limited to a subset of geo-objects of identifiers 130 of geo-object datasets 120 of candidate geo-object set 106. For example, only identifiers 130 of geo-object datasets 120 of candidate geo-object set 106 that fall within a given range that is similar to identifier 130 of the subject object may be compared (e.g., identifiers in the range of "1800-1900").

Upon determining that a candidate object has an identifier that matches the identifier of the subject geo-object, at block 508, method 500 may include associating the subject object to the candidate object having the matching identifier, as depicted at block 510. For example, subject geo-object "Manhattan" and/or corresponding geo-object dataset 120*a* of subject geo-object set 104 may be associated with candidate geo-object "Manhattan" and/or corresponding geo-object dataset 120*a* of candidate geo-object set 106. In some embodiments, associating the subject object to the candidate object having the matching identifier may include providing a mapping there between. For example, associating the subject object to the candidate object having the matching identifier may include providing a mapping between the subject geo-object and/or geo-object data set 120*a* for "Manhattan" of geo-object set 104 and the candidate geo-object and/or geo-object data set 120*a* for "Manhattan" of geo-object set 106.

Method 500 may include determining whether a remaining subject object to be matched exists, as depicted at block 512. Determining whether a remaining subject object to be matched exists may include determining whether or not at least one of the obtained subject geo-objects of subject geo-object set 104 has not yet been matched and/or has not been previously considered for matching with a subject geo-object of candidate geo-object set 106. If it is determined that all of the subject geo-objects of subject geo-object set 104 have been matched and/or at least previously considered for matching with a subject geo-object of candidate geo-object set 106, method 500 may proceed to providing updated object data, as depicted at block 514 and discussed in more detail below. If it is determined that at least one of the obtained subject geo-objects of subject geo-object set 104 has not yet been matched and/or has not been previously considered for matching with a subject geo-object of candidate geo-object set 106, method 500 may proceed to another iteration of identifying a subject object to match with a candidate object, as depicted at block 504. In a second iteration, where at least one of the subject geo-objects of subject geo-object set 104 have been matched and/or previously considered for matching with a subject geo-object of candidate geo-object set 106, anyone of the other subject geo-objects of subject geo-object set 104 may be selected/identified. For example, the New York City geo-object corresponding to geo-object dataset 120*b* of subject geo-object set 104 may be selected/identified to be matched.

Method 500 may proceed to comparing an object identifier of the currently selected/identified subject object to identifiers of candidate objects, as depicted at block 506. As discussed above with regard to block 506, identifiers 130 of geo-object datasets 120 of candidate geo-object set 106 may be searched in an attempt to locate an identifier that matches identifier 130 of "1843" corresponding to geo-object dataset 120*b* of subject geo-object set 104 and/or the New York City geo-object selected/identified at block 504. It may be determined, at block 508, that none of the datasets 120 of candidate object-set 106 have an identifier 130 that matches identifier 130 of "1843" corresponding to geo-object dataset 120*b* of subject geo-object set 104 and the New York City geo-object selected/identified at block 504.

Upon determining that none of the candidate objects have an identifier that matches the identifier of the subject geo-object, at block 508, method 500 may proceed to identifying a set of candidate objects having features to compare with features of the subject object, as depicted at block 516. Identifying a set of candidate objects having features to compare with features of the subject object may include selecting/identifying some, substantially all, or all of the candidate objects. For example, all candidate geo-objects of the subject geo-object data set 106 may be selected/identified such that features 140 of subject geo-object dataset 120*b* may be compared to features 140 of each of candidate geo-object datasets 120*a* and 120*c*-120*h* of candidate geo-object set 106.

In some embodiments, identifying a set of candidate objects having features to compare with features of the subject object may include selecting/identifying a subset of candidate geo-objects 106. For example, identifying a set of candidate objects having features to compare with features of the subject object may include applying filtering to select/identify a subset of candidate geo-objects 106 that appear to be related to the subject object. Such filtering may help to reduce processing load by reducing/narrowing the number of candidate objects that may be considered in attempting to identify an object matching the subject object.

In some embodiments, filtering to select/identify a subset of candidate geo-objects 106 that appear to be at least partially related to the subject object may include filtering based on geographic proximity of candidate objects to the subject object. For example, where filtering includes filtering out candidate geo-objects that are greater than a filtering threshold distance of forty kilometers, the a geographic distance between center ("C2") 152 of geo-object dataset 120*b* of the subject geo-object correspond to name 150 of "New_York_City" and centers 152 of geo-object datasets 120*a* and 120*c*-120*h* of candidate geo-object set 106 may be compared, and only those candidate geo-objects of geo-object set 106 having centers 152 within forty kilometers of center "C2" may be selected/identified for inclusion in the set of candidate geo-objects having features to be compared with features of the subject geo-object correspond to name 150 of "New_York_City". With regard to the illustrated embodiment of FIG. 2B, centers "C1", "C3"-"C6" and "C8" may be within forty kilometers of "C2" (e.g., corresponding to "New_York_City") and center "C7" (e.g., corresponding to "Boston") may be more than forty kilometers from "C2" (e.g., corresponding to "New_York_City"). As a result of filtering, the set of candidate objects may include those geo-objects corresponding to geo-object datasets 120*a*, 120*c*-120*f* and 120*h* of candidate geo-object set 106. Other embodiments may include any suitable filtering threshold distance or technique to filter candidate objects based on proximity or similar features.

In some embodiments, filtering to select/identify a subset of candidate geo-objects 106 that appear to be at least partially related to the subject object may include filtering based on common data associated with candidate objects and the subject object. For example, where a given set of IP-addresses is mapped to or otherwise associated with the subject geo-object, the set of candidate objects may include candidate geo-objects having mapped thereto or otherwise being associated with, at least one of the IP-addresses of the set of IP-address associated with the subject geo-object. For example, where features 140 of geo-object dataset 120*b* for "New_York_City" include data indicative of the IP-address of "124.16.254.1" being mapped to the corresponding subject geo-object, and where features 140 of geo-object dataset 120*a* for "Manhattan" and geo-object dataset 120*h* for "NewYorkCity" indicate that the IP-address of "124.16.254.1" is mapped to each of their corresponding candidate geo-objects, the set of candidate objects may include those geo-objects corresponding to geo-object datasets 120*a* for "Manhattan" and 120*h* for "NewYorkCity". Other embodiments may include filtering based associations of any suitable type of common data.

Method 500 may include identifying a candidate object to be compared to the subject object, as depicted at block 518. Identifying a candidate object to be compared to the subject object may include identifying/selecting one or more of the candidate geo-objects of the set of candidate geo-objects identified at block 516 that have not yet been compared with the subject geo-object identified at block 504. In a first iteration, where no objects of the set of candidate geo-objects identified at block 516 have been compared with the subject geo-object, anyone of the set of candidate geo-objects may be selected/identified. For example, where the set of candidate geo-objects includes candidate geo-objects corresponding to "Manhattan" and "NewYorkCity", the geo-object corresponding to "Manhattan" may be selected/identified for comparison.

Method 500 may include comparing features of the subject object selected/identified to features of the candidate object selected/identified, as depicted at block 520. Comparing features of the subject object selected/identified to features of the candidate object selected/identified may include comparing one or more features 140 of a geo-object dataset 120 corresponding to the subject geo-object of subject geo-object set 104 identified/selected at block 504 to one or more features 140 of a geo-object dataset 120 corresponding to the candidate geo-object of candidate geo-object set 106 identified/selected at block 518. For example, where the geo-object corresponding to "Manhattan" has be selected/identified to be compared to the geo-object corresponding to "New_York_City", one or more features 140 of geo-object dataset 120b of subject geo-object set 104 may be compared to one or more features 140 of geo-object dataset 120a of candidate geo-object set 106.

In some embodiments, comparing features may include comparing names 150, centers 152 and/or shapes 154 of features 140 of the respective geo-object datasets 120. For example, name 150, center 152 and/or shape 154 of geo-object dataset 120b of subject geo-object set 104 may be compared to name 150, center 152 and/or shape 154, respectively, of geo-object dataset 120b of candidate geo-object set 106. In some embodiments, criteria for comparing/matching geo-objects may include the comparison of at least two or more features as discussed in more detail below. In some embodiments, at least one of the two or more features may include a geometric feature such as a geometric center and/or a geometric shape.

In some embodiments, comparing names may be based at least in part on a string edit distance of the two names. For example, where the subject geo-object corresponds to geo-object data set 120b having name 150 of "New_York_City" and the candidate geo-object being compared corresponds to geo-object data set 120a having name 150 of "Manhattan", the string edit distance may be determined to be "13" and/or a string edit equality may be determined to be about 41%, as discussed above. Where the subject geo-object corresponds to geo-object data set 120b having name 150 of "New_York_City" and the candidate geo-object being compared corresponds to geo-object data set 120h having name 150 of "NewYorkCity", the string edit distance may be determined to be "2" and/or a string edit equality may be determined to be about 92%, as discussed above. Similar comparisons of names/strings may be provided using any suitable techniques, including those described herein.

In some embodiments, comparing centers may be based at least in part the proximity of centers to one another. For example, where the subject geo-object corresponds to geo-object data set 120b for "New_York_City" having center 152 of "C2" including geographic coordinates corresponding to location "A" of FIG. 3 and the candidate geo-object being compared corresponds to geo-object data set 120a for "Manhattan" having a center 152 of "C1" including geographic coordinates corresponding to location "B" of FIG. 3, it may be determined that location "C1" is located a distance greater than four kilometers from location "C2", and location "C1" is in the same tile/cell as location "C2", as discussed above with regard to at least FIG. 3. Where the subject geo-object corresponds to geo-object data set 120b for "New_York_City" having center 152 of "C2" including geographic coordinates corresponding to location "A" of FIG. 3 and the candidate geo-object being compared corresponds to geo-object data set 120h for "NewYorkCity" having a center 152 of "C8" including geographic coordinates corresponding to location "C" of FIG. 3, it may be determined that location "C8" is located is located within four kilometers of location "C2", location "C8" is not in the same tile/cell as location "C2", and location "C8" is located within a tile/cell adjacent the tile/cell containing location "C2", as discussed above with regard to at least FIG. 3. Similar comparisons of centers may be provided using any suitable technique, including those described herein with regard to at least FIG. 3.

In some embodiments, comparing shapes may involve determining a percentage of the respective shapes that overlap one another. For example, where the subject geo-object corresponds to geo-object data set 120b for "New_York_City" having shape 154 of "S2" corresponding to boundary 408a of FIG. 4B and the candidate geo-object being compared corresponds to geo-object data set 120a for "Manhattan" having shape 154 of "S1" corresponding to boundary 408c of FIG. 4B, it may be determined that shapes "S2" and "S1" have an overlap of about 42% based on internal covering, as discussed above with regard to at least FIG. 4B. Where the subject geo-object corresponds to geo-object data set 120b for "New_York_City" having shape 154 of "S2" corresponding to boundary 408a of FIG. 4A and the candidate geo-object being compared corresponds to geo-object data set 120h for "NewYorkCity" having shape 154 of "S8" corresponding to boundary 408b of FIG. 4A, it may be determined that shapes "S2" and "S8" have an overlap of about 87% based on internal covering, as discussed above with regard to at least FIG. 4A. Similar comparisons of shapes may be provided using any suitable techniques, including those described herein with regard to at least FIGS. 4A-4D.

Method 500 may include determining whether a sufficient match between features has been identified, as depicted at block 522. In some embodiments, a determination of a sufficient match between features may be based at least in part on whether or not specified criteria for similar/matching features have been satisfied. For example, a subject geo-object may be determined to match a given candidate object if the results of the comparison of one or more features (e.g., name, center and/or shape) satisfies a corresponding matching criteria.

In some embodiments, a first matching criterion may specify that a candidate geo-object matches the subject geo-object if the names are the same and the centers are the same.

In some embodiments, two names may be determined to be the same when the string edit distance is equal to a value of "0" and/or the string edit equality is equal to "100%", indicative of the names being identical. For example, the names of "New_York_City" and "New_York_City" may have a string edit distance of "0" and string edit equality of "100%" as they are identical. In some embodiments, two names may be determined to be the same when the string edit distance is satisfies a given threshold string edit value of "0" or "100%" or about "0" or "100%", indicative of the names being identical or nearly identical.

In some embodiments, two centers may be determined to be the same when they are identical. For example, two centers may be determined to be the same when they include the same geographic coordinates. In some embodiments, centers may be determined to be the same when they are within a given number of tiles/cells of one another on a geographic mapping. For example, criteria may require that two centers must be located within the same tile to be determined to be the same. Where the subject geo-object corresponds to geo-object data set 120b for "New_York_City" having center 152 of "C2" including geographic coordinates corresponding to location "A" of FIG. 3 and the candidate geo-object being compared corresponds to geo-object data set 120a for "Manhattan" having a center 152 of "C1" including geographic coordinates corresponding to location "B" of FIG. 3, it may be determined that location "C1" is the same as location "C2" based on the location "C1" being in the same tile/cell as location "C2". In some embodiments, centers may be determined to be the same when they are within a given distance (e.g., radius) of one another. For example, the two centers may have to be within a distance of one-half kilometer of one another to be determined to be the same. Where the subject geo-object corresponds to geo-object data set 120b for "New_York_City" having center 152 of "C2" including geographic coordinates corresponding to location "A" of FIG. 3 and the candidate geo-object being compared corresponds to geo-object data set 120h for "NewYorkCity" having a center 152 of "C8" including geographic coordinates corresponding to location "C" of FIG. 3, it may be determined that location "C8" is located is located within 0.4 kilometers of location "C2" and, thus, centers"C8" and "C2" may be determined to be the same.

In some embodiments, a second matching criterion may specify that a candidate geo-object matches the subject geo-object if the names are similar and the shapes are similar.

In some embodiments, whether or not two names are determined to be similar may be based on whether or not a corresponding string edit distance satisfies a corresponding string edit threshold. For example, where the string edit threshold has a value of "5", the two names "New_York_City" and "NewYorkCity" of geo-object datasets 120b and 120h may be determined to be similar based on the corresponding string edit distance of "2" that is less than the string edit threshold value of "5". In contrast, where the string edit threshold has a value of "5", the two names "New_York_City" and "Manhattan" of geo-object datasets 120b and 120a may be determined to be dissimilar based on the corresponding string edit distance of "13" exceeding the string edit threshold value of "5".

In some embodiments, whether or not two names are determined to be similar may be based on whether or not a corresponding string edit equality satisfies a corresponding string edit threshold. For example, where the string edit threshold has a value of "85%", the two names/strings "New_York_City" and "NewYorkCity" of geo-object datasets 120b and 120h may be determined to be similar based on the corresponding string edit equality of about 92%. In contrast, where the string edit threshold has a value of "85%", the two names "New_York_City" and "Manhattan" of geo-object datasets 120b and 120a maybe determined to be dissimilar based on the corresponding string edit equality of about 0%.

In some embodiments, shapes of two geo-objects may be determined to be similar where the shapes have an overlap that satisfies a given threshold percentage. For example, where an overlap threshold percentage of 85% is required, and where the subject geo-object corresponds to geo-object data set 120b for "New_York_City" having shape 154 of "S2" corresponding to boundary 408a of FIG. 4B and the candidate geo-object being compared corresponds to geo-object data set 120a for "Manhattan" having shape 154 of "S1" corresponding to boundary 408c of FIG. 4B, it may be determined that shapes "S2" and "S1" have an overlap of about 42% based on internal covering (as discussed above with regard to at least FIG. 4B) and, thus, it may be determined that shapes "S2" and "S1" are not similar. Where an overlap threshold percentage of 85% is required, and where the subject geo-object corresponds to geo-object data set 120b for "New_York_City" having shape 154 of "S2" corresponding to boundary 408a of FIG. 4A and the candidate geo-object being compared corresponds to geo-object data set 120h for "NewYorkCity" having shape 154 of "S8" corresponding to boundary 408b of FIG. 4A, it may be determined that shapes "S2" and "S8" have an overlap of about 87% based on internal covering (as discussed above with regard to at least FIG. 4A). Thus, it may be determined that shapes "S2" and "S8" are similar.

In some embodiments, a third matching criteria may specify that a candidate geo-object matches the subject geo-object if the names are similar, the centers are similar, and a shape for at least one of the geo-objects is not specified.

In some embodiments, centers may be determined to be similar based on their proximity to one another, as discussed above. In some embodiments, centers may be determined to be similar if they are within a given distance (e.g., radius) of one another. For example, criteria may require that the two centers have to be within a distance of four kilometers of one another to be determined to be similar. Where the subject geo-object corresponds to geo-object data set 120b for "New_York_City" having center 152 of "C2" including geographic coordinates corresponding to location "A" of FIG. 3 and the candidate geo-object being compared corresponds to geo-object data set 120a for "Manhattan" having a center 152 of "C1" including geographic coordinates corresponding to location "B" of FIG. 3, it may be determined that location "C1" is located a distance greater than four kilometers from location "C2" and, thus, centers "C1" and "C2" are not similar. Where the subject geo-object corresponds to geo-object data set 120b for "New_York_City" having center 152 of "C2" including geographic coordinates corresponding to location "A" of FIG. 3 and the candidate geo-object being compared corresponds to geo-object data set 120h for "NewYorkCity" having a center 152 of "C8" including geographic coordinates corresponding to location "C" of FIG. 3, it may be determined that location "C8" is located is located within four kilometers of location "C2" and, thus, centers "C8" and "C2" may be determined to be at least similar. In some embodiments, the relative distance between centers may be expressed in terms of cell/tiles. For example, it may be determined that center "C8" (including geographic coordinates corresponding to location "C" of FIG. 3) is similar to center "C2" (including geographic coordinates corresponding to location "A" of FIG. 3) based on the centers being located within one tile/cell 304 of one another. In some embodiments, centers may be considered similar if they are located in the same cell/tile. For example, it may be determined that center "C1" (including geographic coordinates corresponding to location "A" of FIG. 3) is similar to center "C2" (including geographic coordinates corresponding to location "A" of FIG. 3) based on the centers being located within the same tile/cell 304a.

In some embodiments, a fourth matching criteria may specify that a candidate geo-object matches the subject geo-object if the shapes are substantially similar.

In some embodiments, shapes of two geo-objects may be determined to be substantially similar where they have an overlap that exceeds a relatively high threshold percentage. For example, where objects are considered to be substantially similar if their overlap meets or exceeds 95%, which, notably, is greater than the overlap threshold percentage of 85% required shapes to be determined to be similar, it may be determined that shapes "S2" and "S1" are not substantially similar based on the overlap of about 42%, discussed above. Further, it may be determined that shapes "S2" and "S8" are not substantially similar based on the overlap of about 87%, discussed above.

In some embodiments, matching criteria may be considered in parallel. For example, all four matching criteria may be considered at substantially the same time to determine whether or not the subject and candidate objects match. In some embodiments, matching criteria may be considered sequentially (e.g., in series). For example, the first matching criteria may be considered to determine whether or not the subject and candidate objects match, if a match is identified, method 500 may determine that sufficient matching features exists and move on to block 528 to associated the subject object to the candidate object, or, if a match is not identified based on the first criteria, method 500 may proceed to considering the second matching criteria. The second, third and fourth matching criteria may be considered in a manner similar to that described with regard to the first matching criteria. Such a sequential consideration may provide for reducing the processing load for matching features, as the matching criteria may increase in complexity from the first to the forth matching criteria. Accordingly, more complex processing associated with a given matching criteria may be avoided if a match is identified as a result of processing/consideration of a preceding matching criteria.

In some embodiments, a sufficient match may be identified where at least one, multiple and/or all of the matching criteria is satisfied. For example, it may be determined that a subject geo-object and a candidate geo-object match if the comparison at block 520 results in at least one of the first, second, third or fourth matching criteria being satisfied. For example, as discussed in more detail below, where the subject geo-object corresponds to geo-object data set 120*b* for "New_York_City" and the candidate geo-object being compared corresponds to geo-object data set 120*h* for "NewYorkCity", the comparison at block 520 may result in a determination that at least one of the four matching criteria has been met. In contrast, it may be determined that a subject geo-object and a candidate geo-object are do not match if the comparison at block 520 results in none of the first, second, third or fourth matching criteria being satisfied. For example, where the subject geo-object corresponds to geo-object data set 120*b* for "New_York_City" and the candidate geo-object being compared corresponds to geo-object data set 120*a* for "Manhattan", the comparison at block 520 may result in a determination that none of the four matching criteria have been met. In some embodiments, upon determining that a candidate geo-object does not meet the matching criteria, and, thus, a sufficient match is not identified, method 500 may proceed to determining whether a remaining candidate object to be compared exists, as depicted at block 524.

Determining whether a remaining candidate object to be compared exists may include determining whether or not at least one of the set of candidate objects identified at block 516 has not yet been compared to the subject object. If it is determined that all of the candidate geo-objects of the set of candidate objects have been compared to the subject object (e.g., all of the potential matches for the subject object have been exhausted), method 500 may proceed to providing an indication that no matching candidate object has been identified for the subject object, as depicted at block 526. If it is determined that at least one of the candidate geo-objects of the set of candidate objects has not been compared to the subject object, method 500 may proceed to another iteration of identifying a candidate object to be compared to the subject object, as depicted and described with regard to block 518. In a second iteration, where at least one of the candidate objects of the set of candidate objects have been compared, anyone of the other candidate objects of the set of candidate objects may be selected/identified. For example, where the candidate geo-object corresponding to geo-object data set 120*a* for "Manhattan" has been compared in the first iteration, the candidate geo-object corresponding to geo-object data set 120*h* for "NewYorkCity" may be selected/identified.

As discussed above, where the subject geo-object corresponds to geo-object data set 120*b* for "New_York_City" and the candidate geo-object being compared corresponds to geo-object data set 120*h* for "NewYorkCity", the comparison at block 520 may result in a determination that at least one of the matching criteria have been satisfied (e.g., at least the first, second and/or third matching criteria may be determined to be met as discussed above). In some embodiments, upon determining that a candidate geo-object does satisfy the matching criteria, and, thus, a sufficient matching features are identified at block 522, method 500 may proceed to associating the subject object to the candidate object with matching features (e.g., associating the matching objects with one another), as depicted at block 528. For example, the subject geo-object and/or geo-object data set 120*b* for "New_York_City" and the candidate geo-object and/or geo-object data set 120*h* for "NewYorkCity" may be associated with one another. In some embodiments, associating the subject object to the candidate object having the matching features may include providing a mapping there between. For example, associating the subject object to the candidate object having the matching feature may include providing a mapping between the subject geo-object and/or geo-object data set 120*b* for "New_York_City" of geo-object set 104 and the candidate geo-object and/or geo-object data set 120*h* for "NewYorkCity" of geo-object set 106. The mapping may be stored and/or added to a mapping (e.g., an index mapping objects of first geo-object set 104 and second geo-object set 106) to be provided with the updated object data, as described below.

Method 500 may again return to block 512 to determine whether a remaining subject object to be matched exists. For example, method 500 may repeat the processing for other subject geo-objects of geo-object set 104. If it is determined that all of the subject geo-objects of subject geo-object set 104 have been matched and/or at least previously considered for matching with a subject geo-object of candidate geo-object set 106, method 500 may proceed to providing updated object data, as depicted at block 514.

Providing updated object data may include providing a mapping of geo-objects and/or geo-object datasets 120 of subject geo-object set 104 to geo-objects and/or geo-object datasets 120 of candidate geo-object set 106 (e.g., an index mapping objects of first geo-object set 104 and second geo-object set 106). For example, an index may be generated/stored/transmitted that is indicative of the mapping between the subject geo-object and/or geo-object data set 120*a* for "Manhattan" of geo-object set 104 and the candidate geo-object and/or geo-object data set 120*a* for "Manhattan" of geo-object set 106 and/or the mapping between the subject geo-object and/or geo-object data set 120*b* for "New_York_City" of geo-object set 104 and the candidate geo-object and/or geo-object data set 120*h* for "NewYorkCity" of geo-object set 106.

In some embodiments, providing updated object data may include employing some or all of the matches identified. For example, where the subject geo-object and/or geo-object data set 120*b* for "New_York_City" and the candidate geo-object and/or geo-object data set 120*h* for "NewYorkCity" are associated with one another, providing updated object data may include consolidating geo-object dataset 120*b* with geo-object dataset 120*h*. Where, for example, features 140 geo-object data set 120*b* includes a listing of one-thousand IP-address mapped thereto, and features 140 of geo-object dataset 120*h* include a listing of six-hundred of the one-thousand IP-address mapped thereto, features 140 of geo-object dataset 120*h* may be updated to include a listing of all one-thousand IP-addresses as being mapped thereto.

Method 500 is an exemplary embodiment of a method employed in accordance with techniques described herein. Method 500 may be may be modified to facilitate variations of its implementations and uses. Method 500 may be implemented in software, hardware, or a combination thereof. Some or all of method 500 may be implemented by object matching module 102. The order of method 500 may be changed, and various elements may be added, reordered, combined, omitted, modified, etc.

Exemplary Computer System

Figure 6:
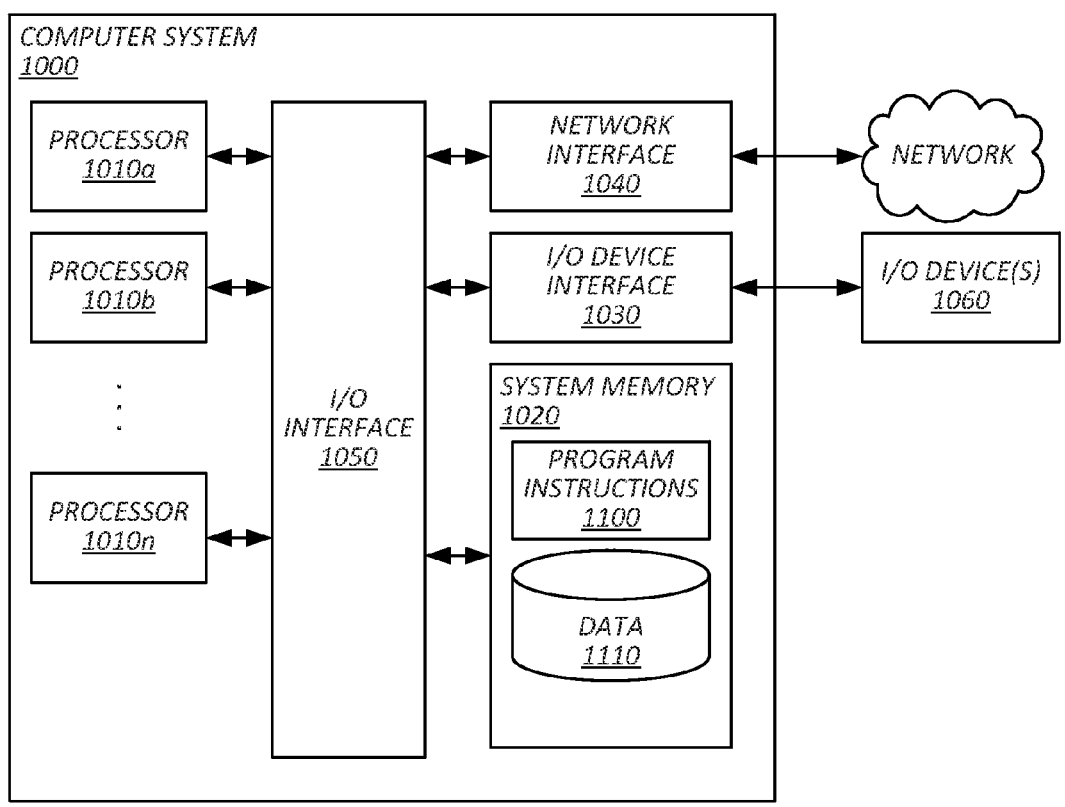
FIG. 6 is a diagram that illustrates an exemplary computer system in accordance with one or more embodiments of the present technique.

FIG. 6 is a diagram that illustrates an exemplary computer system 1000 in accordance with one or more embodiments of the present technique. Various portions of systems and methods described herein, may include or be executed on one or more computer systems similar to system 1000. For example, mapping system 100 may include a configuration similar to at least a portion of computer system 1000. Further, methods/processes/modules described herein may be executed by one or more processing systems similar to that of computer system 1000.

Computer system 1000 may include one or more processors (e.g., processors 1010*a*-1010*n*) coupled to system memory 1020, an input/output I/O device interface 1030 and a network interface 1040 via an input/output (I/O) interface 1050. A processor may include a single processor device and/or a plurality of processor devices (e.g., distributed processors). A processor may be any suitable processor capable of executing/performing instructions. A processor may include a central processing unit (CPU) that carries out program instructions to perform the basic arithmetical, logical, and input/output operations of computer system 1000. A processor may include code (e.g., processor firmware, a protocol stack, a database management system, an operating system, or a combination thereof) that creates an execution environment for program instructions. A processor may include a programmable processor. A processor may include general and/or special purpose microprocessors. A processor may receive instructions and data from a memory (e.g., system memory 1020). Computer system 1000 may be a uni-processor system including one processor (e.g., processor 1010*a*), or a multi-processor system including any number of suitable processors (e.g., 1010*a*-1010*n*). Multiple processors may be employed to provide for parallel and/or sequential execution of one or more portions of the techniques described herein. Processes and logic flows described herein may be performed by one or more programmable processors executing one or more computer programs to perform functions by operating on input data and generating corresponding output. Processes and logic flows described herein may be performed by, and apparatus can also be implemented as, special purpose logic circuitry, e.g., an FPGA (field programmable gate array) or an ASIC (application specific integrated circuit). Computer system 1000 may include a computer system employing a plurality of computer systems (e.g., distributed computer systems) to implement various processing functions.

I/O device interface 1030 may provide an interface for connection of one or more I/O devices 1060 to computer system 1000. I/O devices may include any device that provides for receiving input (e.g., from a user) and/or providing output (e.g., to a user). I/O devices 1060 may include, for example, graphical user interface displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 and/or data 1110. Program instructions 1100 may be executable by a processor (e.g., one or more of processors 1010*a*-1010*n*) to implement one or more embodiments of the present technique. Instructions 1100 may include modules of computer program instructions for implementing one or more techniques described herein with regard to various processing modules. Program instructions may include a computer program (also known as a program, software, software application, script, or code). A computer program may be written in any form of programming language, including compiled or interpreted languages, or declarative/procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a propagated signal and/or a non-transitory computer readable storage medium. A propagated signal may include an artificially generated signal (e.g., a machine generated electrical, optical, or electromagnetic signal) having encoded information embedded therein. The propagated signal may be transmitted by a suitable transmitter device to and/or received by a suitable receiver device. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or other forms of non-transitory computer readable storage media. System memory 1020 may include a non-transitory computer readable storage medium may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices and/or software that may perform or otherwise provide for the performance of the techniques described herein. For example, computer system 1000 may include a desktop computer, a laptop computer, a tablet computer, a server device, a client device, a mobile telephone, a personal digital assistant (PDA), a mobile audio or video player, a game console, a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" may include a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for mapping geographic objects of a second database to geographic objects of a first database, the method comprising:
   identifying a subject geographic object of the first database comprising an identifier for which a corresponding candidate geographic object of the second database comprising the same identifier has not been identified, the subject geographic object corresponding to a subject dataset comprising at least two of the following:
   a descriptor of the subject geographic object;
   a geographic center of the subject geographic object; and
   a geographic shape of the subject geographic object;
   identifying, via comparison of the subject dataset corresponding to the subject geographic object to a plurality of candidate datasets each corresponding to a candidate geographic object of the second database, a candidate dataset comprising at least two of the following:
- a descriptor of a candidate geographic object that matches the descriptor of the subject geographic object;
- a geographic center of a candidate geographic object that matches the geographic center of the subject geographic object; and
- a geographic shape of a candidate geographic object that matches the geographic shape of the subject geographic object; and mapping the subject geographic object to a candidate geographic object corresponding to the identified candidate dataset, wherein both the subject dataset and the candidate dataset are stored as structured data in the first database and the second database, respectively, prior to identifying the candidate dataset.

2. The method of claim 1, wherein:
the geographic center of the subject geographic object is defined by the center of the land area occupied by the subject geographic object; and
the geographic shape of the subject geographic object is defined by the boundaries of the land area occupied by the subject geographic object.

3. A computer-implemented method, comprising:
obtaining a subject dataset comprising two or more features associated with a subject geographic object;
obtaining a candidate dataset comprising two or more features associated with a candidate geographic object;
comparing, using a computer, at least two features of the subject dataset to at least two corresponding features of the candidate dataset, at least one of the features compared comprising a geographic feature; and
determining whether the candidate geographic object matches the subject geographic object based on the comparison, wherein both the subject dataset and the candidate dataset are stored in memory as structured data prior to comparing the at least two features of the subject dataset to the at least two corresponding features of the candidate dataset.

4. The method of claim 3,
wherein the subject dataset comprises at least two of the following: a descriptor of the subject geographic object, a geographic center of the subject geographic object, and a geographic shape of the geographic object, and
wherein the candidate dataset comprises at least two of the following: a descriptor of the candidate geographic object, a geographic center of the candidate geographic object, and a geographic shape of the candidate geographic object.

5. The method of claim 4, wherein comparing at least two features of the subject dataset to at least two corresponding features of the candidate dataset comprises at least two of:
comparing the descriptor of the subject geographic object to the descriptor of the candidate geographic object;
comparing the geographic center of the subject geographic object to the geographic center of the candidate geographic object; and
comparing the geographic shape of the subject geographic object to the geographic shape of the candidate geographic object.

6. The method of claim 5, wherein comparing the descriptor of the subject geographic object to the descriptor of the candidate geographic object comprises determining a string edit distance between the descriptor of the subject geographic object and the descriptor of the candidate geographic object, and comparing the string edit distance to a string edit threshold value.

7. The method of claim 5, wherein comparing the descriptor of the subject geographic object to the descriptor of the candidate geographic object comprises determining a string edit equality between the descriptor of the subject geographic object and the descriptor of the candidate geographic object, and comparing the string edit equality to a string edit threshold value.

8. The method of claim 5, wherein comparing the geographic center of the subject geographic object to the geographic center of the candidate geographic object comprises determining a distance between the geographic center of the subject geographic object and the geographic center of the candidate geographic object, and comparing the distance to a center distance threshold value.

9. The method of claim 5, wherein comparing the geographic center of the subject geographic object to the geographic center of the candidate geographic object comprises:
determining a first tile of a map comprising the geographic center of the subject geographic object;
determining a second tile of the map comprising the geographic center of the candidate geographic object; and
determining whether the first and second tiles of the map are located within a threshold number of tiles of one another.

10. The method of claim 5, wherein comparing the geographic shape of the subject geographic object to the geographic shape of the candidate geographic object comprises determining an extent of overlap between the geographic shape of the subject geographic object and the geographic shape of the candidate geographic object, and comparing the extent of overlap to a threshold overlap value.

11. The method of claim 5, wherein areas of the geographic shape of the subject geographic object and the geographic shape of the candidate geographic object are defined by covering of the respective geographic shapes.

12. The method of claim 5, wherein determining whether the candidate geographic object corresponds to the subject geographic object based on the comparison comprises determining that the candidate geographic object corresponds to the subject geographic object if at least one of the following conditions are satisfied:
based on comparing the descriptor of the subject geographic object to the descriptor of the candidate geographic object it is determined that the descriptors are the same, and based on comparing the geographic center of the subject geographic object to the geographic center of the candidate geographic object it is determined that the geographic centers are the same;
based on comparing the descriptor of the subject geographic object to the descriptor of the candidate geographic object it is determined that a string edit between the descriptors satisfies a string edit threshold value, and based on comparing the geographic shape of the subject geographic object to the geographic shape of the candidate geographic object it is determined that an overlap of the geographic shapes satisfy a first threshold overlap value;
based on comparing the descriptor of the subject geographic object to the descriptor of the candidate geographic object it is determined that a string edit between the descriptors satisfies a string edit threshold value, and based on comparing the geographic center of the subject geographic object to the geographic center of the candidate geographic object it is determined that the distance between the geographic centers satisfies a center distance threshold value; and based on comparing the geographic shape of the subject geographic object to the geographic shape of the candidate geographic object it is determined that an overlap of the geographic shapes satisfy a second threshold overlap value that requires a greater overlap between the geographic shapes than is required by the first threshold overlap value.

13. The method of claim 5, wherein:

the geographic center of the subject geographic object is defined by the center of the surface area of the planet occupied by the subject geographic object; and the geographic shape of the subject geographic object is defined by the boundaries of the center of the surface area of the planet occupied by the subject geographic object.

14. The method of claim 3, wherein the subject geographic object comprises a subject identifier for which a corresponding geographic object comprising an identifier corresponding to the subject identifier has not been identified.

15. The method of claim 14, wherein a corresponding identifier comprises an identifier that is the same or similar to the subject identifier.

16. The method of claim 3, wherein the candidate geographic object comprises an identifier that does not correspond to an identifier of the subject geographic object.

17. The method of claim 16, wherein the identifier corresponding to the subject geographic object is generated based on the application of a hash function to at least a portion of the subject dataset, and wherein the identifier corresponding to the candidate geographic object is generated based on the application of the hash function to at least a portion of the candidate dataset.

18. The method of claim 3, wherein identifying a candidate geographic object comprises identifying the candidate geographic object from a subset of geographic objects identified as being related to the subject geographic object.

19. The method of claim 18, wherein the subset of geographic objects identified as being related to the subject geographic object comprise a candidate dataset having at least some features in common with the subject dataset.

20. The method of claim 3, wherein the subject data set comprises features corresponding to the subject geographic object at a first time, and wherein the candidate dataset comprises features corresponding to the candidate geographic object at a second time subsequent to the first time.

21. A tangible non-transitory computer readable storage medium having computer-executable program instructions stored thereon, that are executable by one or more computers to cause steps comprising:

obtaining a subject dataset comprising two or more features associated with a subject geographic object;

obtaining a candidate dataset comprising two or more features associated with a candidate geographic object;

comparing, using a computer, at least two features of the subject dataset to at least two corresponding features of the candidate dataset, at least one of the features compared comprising a geographic feature; and determining whether the candidate geographic object matches the subject geographic object based on the comparison, wherein both the subject dataset and the candidate dataset are stored in memory as structured data prior to comparing the at least two features of the subject dataset to the at least two corresponding features of the candidate dataset.

22. A system, comprising:

one or more processors;

a memory; and an object matching module stored on the memory, the object matching module configured to be executed by the one or more processors to cause operations comprising:

obtaining a subject dataset comprising two or more features associated with a subject geographic object;

obtaining a candidate dataset comprising two or more features associated with a candidate geographic object;

comparing, using the one or more processors, at least two features of the subject dataset to at least two corresponding features of the candidate dataset, at least one of the features compared comprising a geographic feature; and determining whether the candidate geographic object matches the subject geographic object based on the comparison, wherein both the subject dataset and the candidate dataset are stored in the memory as structured data prior to comparing the at least two features of the subject dataset to the at least two corresponding features of the candidate dataset.

23. A computer implemented method for matching first and second geographic entity stored in one or more geographic information systems, comprising:

retrieving information about a first geographic entity and a second geographic entity from at least one of the one or more geographic information systems, the retrieved information including two or more of a name, a geographic center and a geographic area of the entity; and comparing the retrieved information to determine whether the first and second geographical entities match one another, wherein the first and second geographic entities are determined to match one another if it is determined that at least one of the following conditions exists:

A) the name of the first entity matches the name of the second entity within a predetermined string edit distance and the area of the first entity overlaps the area of the second entity by at least a first amount;

B) the name of the first entity matches the name of the second entity to within a predetermined string edit distance, and the geographic centers of the first and second entities are less than a predetermined distance apart; and C) the area of the first geographic entity overlaps the area of the second geographic entity by at least a second amount that is greater than the first amount, wherein both the subject dataset and the candidate dataset are stored in the one or more geographic information systems as structured data prior to comparing the retrieved information to determine whether the first and second geographical entities match one another.

* * * * *